(12) United States Patent
Sato et al.

(10) Patent No.: US 9,738,076 B2
(45) Date of Patent: Aug. 22, 2017

(54) MANUFACTURING METHOD OF LIQUID EJECTION HEAD

(75) Inventors: Tamaki Sato, Kawasaki (JP); Masafumi Morisue, Tokyo (JP); Tetsushi Ishikawa, Tokyo (JP); Hirono Yoneyama, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 14/348,023

(22) PCT Filed: Sep. 12, 2012

(86) PCT No.: PCT/JP2012/005796
§ 371 (c)(1),
(2), (4) Date: Mar. 27, 2014

(87) PCT Pub. No.: WO2013/046570
PCT Pub. Date: Apr. 4, 2013

(65) Prior Publication Data
US 2014/0231542 A1    Aug. 21, 2014

(30) Foreign Application Priority Data

Sep. 29, 2011  (JP) .................................. 2011-215334
Jul. 26, 2012  (JP) .................................. 2012-165879

(51) Int. Cl.
*B41J 2/16*    (2006.01)
*B29C 33/00*   (2006.01)
*B05B 15/02*   (2006.01)

(52) U.S. Cl.
CPC ............. *B41J 2/1621* (2013.01); *B05B 15/02* (2013.01); *B29C 33/0083* (2013.01);
(Continued)

(58) Field of Classification Search
CPC ...... B41J 2/1601; B41J 2/1603; B41J 2/1604; B41J 2/162; B41J 2/1621; B41J 2/1631;
(Continued)

(56) References Cited

U.S. PATENT DOCUMENTS 5,697,144 A * 12/1997 Mitani ............. Y10T 29/49083
216/27
6,766,579 B2 * 7/2004 Ohkuma ........... Y10T 29/49401
29/847
(Continued)

FOREIGN PATENT DOCUMENTS

CN    101896352 A    11/2010
JP    9-1809 A       1/1997
(Continued)

OTHER PUBLICATIONS

Machine Translation (English) of Japanese Patent Publication JP 2008-126630, Sep. 2016.*
(Continued)

*Primary Examiner* — A. Dexter Tugbang
(74) *Attorney, Agent, or Firm* — Canon U.S.A., Inc. IP Division

(57) ABSTRACT

A manufacturing method of a liquid ejection head, which includes a step of preparing a substrate including a first layer, a step of forming a flow path mold for forming the flow path and a member located outside the mold with a gap between the mold and the member from the first layer, a step of providing a second layer so that the second layer fills the gap and covers the mold and the member located outside the mold with the gap between them, a step of forming an ejection orifice forming member for forming an ejection orifice from the second layer, a step of removing the member located outside the mold with the gap between them, and a step of forming a wall member located outside the ejection orifice forming member with at least a partial gap between the ejection orifice forming member and the wall member.

11 Claims, 6 Drawing Sheets

(52) U.S. Cl.
CPC .............. *B41J 2/1601* (2013.01); *B41J 2/162* (2013.01); *B41J 2/1603* (2013.01); *B41J 2/1604* (2013.01); *B41J 2/1631* (2013.01); *B41J 2/1637* (2013.01); *B41J 2/1639* (2013.01); *Y10T 29/49083* (2015.01); *Y10T 29/49401* (2015.01)

(58) Field of Classification Search
CPC ....... B41J 2/1637; B41J 2/1639; B05B 15/02; B29C 33/0083; Y10T 29/49083; Y10T 29/49401
See application file for complete search history.

(56) References Cited

U.S. PATENT DOCUMENTS

| | | | | |
|---|---|---|---|---|
| 7,322,104 | B2 * | 1/2008 | Koyama | ........... Y10T 29/49401 216/27 |
| 2003/0198899 | A1 | 10/2003 | Ohkuma | |
| 2006/0055731 | A1 | 3/2006 | Yabe | |
| 2008/0292993 | A1 | 11/2008 | Ishikura et al. | |
| 2010/0315467 | A1 | 12/2010 | Takeuchi et al. | |

FOREIGN PATENT DOCUMENTS

| | | | |
|---|---|---|---|
| JP | H10-157150 | A | 6/1998 |
| JP | 2003-300323 | A | 10/2003 |
| JP | 2007-216630 | A | 8/2007 |
| JP | 2007283629 | A * | 11/2007 |
| JP | 2008-126630 | A | 6/2008 |
| JP | 2008-149663 | A | 7/2008 |
| JP | 2008-173971 | A | 7/2008 |
| JP | 2011-102001 | A | 5/2011 |
| KR | 10-2011-0021659 | A | 3/2011 |

OTHER PUBLICATIONS

Machine Translation (English) of Japanese Patent Publication JP 2007-216630, Sep. 2016.*

* cited by examiner

MANUFACTURING METHOD OF LIQUID EJECTION HEAD

TECHNICAL FIELD

The present invention relates to a manufacturing method of a liquid ejection head that ejects liquid.

BACKGROUND ART

As a typical example of a liquid ejection head that ejects liquid, there is an inkjet recording head applied to an inkjet recording method for ejecting ink to a recording medium and performing recording. The inkjet recording head generally includes an ink flow path, an energy generating element provided at a part of the flow path, and an ejection orifice that ejects ink by energy generated by the energy generating element.

A method for manufacturing a liquid ejection head is disclosed in PTL 1. In the method, on a substrate including an energy generating element, a mold of flow path is formed using a photosensitive material and a peripheral mold member is formed around the pattern of flow path. Next, a covering layer is coated on these and an opening, which will be an ejection orifice, is formed in a position in the covering layer facing the energy generating element. Then, the mold of flow path is removed to form a space to be a flow path, so that the liquid ejection head is manufactured. According to the method of PTL 1, the peripheral mold member is provided, so that it is possible to improve coatability of the covering layer at a corner of the mold of flow path.

In the same manner as the mold of flow path, the peripheral mold member is generally removed from an opening formed in the same manner as the ejection orifice by considering heat tolerance during the head manufacturing process and ink tolerance while the head is being used. In the space (removed portion) formed by removing the peripheral mold member from the opening, an electrical circuit unit for driving the energy generating element may be disposed. Therefore, it is required that a protective member protects the electrical circuit unit in order to prevent wiring or the like from being corroded by ink.

On the other hand, when the head is used, ink mist and the like occur and the ink may attach to an ejection orifice surface (a head face) where the ejection orifice opens. The attached ink is generally wiped off by a wiping mechanism such as a wiping blade installed in a recording device. At this time, if there is no portion where liquid-repellent property is different or no concave portion on the ejection orifice surface, there is no place to store the wiped ink, so that the attached ink may not be removed from an area around the ejection orifice. The removed portion from which the peripheral mold member is removed has a function to temporarily collect the wiped ink from the ejection orifice surface. The ink collected in the removed portion is recovered by a suction restoration operation by the recording device.

CITATION LIST

Patent Literature

PTL 1: Japanese Patent Laid-Open No. 9-1809

In recent years, a recording device is required to realize higher image quality and higher recording speed, so that it is required that ejection orifices and flow paths connected to the ejection orifices are densely arranged and the volumes of ejected droplets are further equalized. Therefore, planarization of the ejection orifice surface where the ejection orifices open is required so that the distance between the energy generating element and the ejection orifice is further equalized.

When planarizing the ejection orifice surface by using the method of PTL 1, it is considered that the peripheral mold member is enlarged and the area of a surface of the peripheral mold member in parallel with the substrate surface is enlarged.

However, when the peripheral mold member is enlarged and the area of the surface of the peripheral mold member in parallel with the substrate surface is enlarged, an exposed area of the electrical circuit unit is enlarged, and for example, even if the electrical circuit unit is covered by a covering layer or the like, the electrical circuit may not be sufficiently protected from ink. Further, the wiping blade or a jammed sheet of paper may directly come into contact with the electrical circuit unit and the reliability of the liquid ejection head may degrade. On the other hand, if the electrical circuit unit is excessively covered by a covering layer, there is no place to store the wiped ink.

Therefore, the present invention provides a manufacturing method of a liquid ejection head which achieves both the evenness of the ejection orifice surface and the protection of the electrical circuit on the substrate.

SUMMARY OF INVENTION

The problems described above are solved by the invention described below. Specifically, the present invention is a manufacturing method of a liquid ejection head including a flow path connected to an ejection orifice that ejects liquid. The manufacturing method includes a step of preparing a substrate including a first layer, a step of forming a flow path mold for forming the flow path and a member located outside the mold with a gap between the mold and the member from the first layer, a step of providing a second layer so that the gap is filled with the second layer and the second layer covers the mold and the member located outside the mold with the gap between the mold and the member, a step of forming an ejection orifice forming member for forming an ejection orifice from the second layer, a step of removing the member located outside the mold with the gap between the mold and the member, and a step of forming a wall member located outside the ejection orifice forming member with at least a partial gap between the ejection orifice forming member and the wall member, in this order.

According to the present invention, it is possible to manufacture a liquid ejection head which achieves both the evenness of the ejection orifice surface and the protection of the electrical circuit on the substrate.

DESCRIPTION OF EMBODIMENTS

Hereinafter, the present invention will be described with reference to the drawings.

A liquid ejection head can be mounted in a device such as a printer, a copy machine, a facsimile having a communication system, a word processor or the like that has a printer unit, and an industrial recording device complexly combined with various processing devices. For example, the liquid ejection head can be used to create a biochip, print an electronic circuit, and eject a drug in a mist form.

Figure 1:
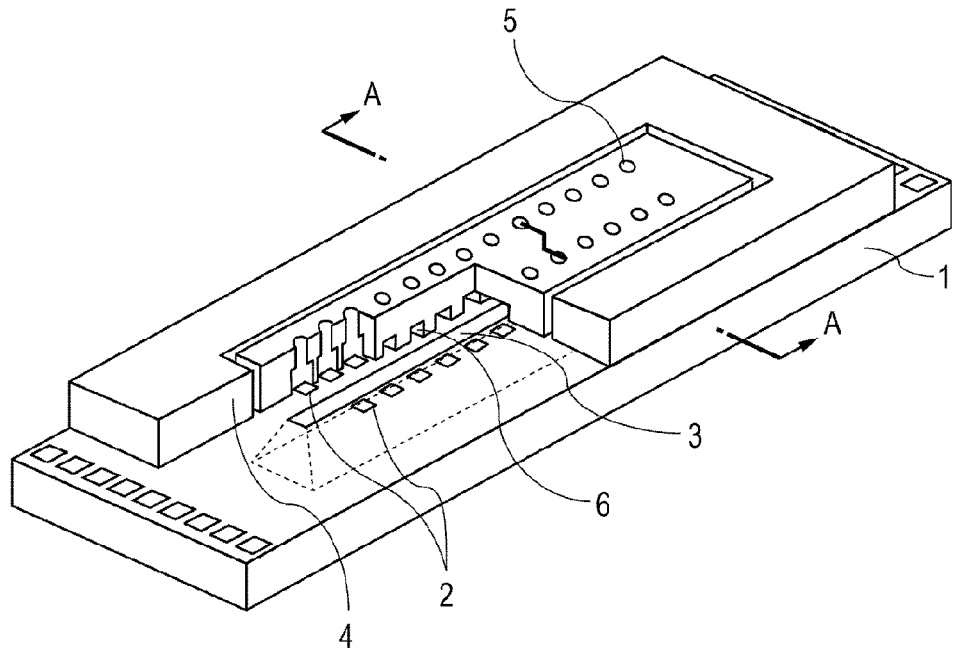
FIG. 1 is a diagram showing an example of a liquid ejection head manufactured by the present invention.

FIG. 1 is a diagram showing an example of a liquid ejection head manufactured by the present invention. The liquid ejection head shown in FIG. 1 includes a substrate 1 on which energy generating elements 2, which generate energy used to eject liquid such as ink, are formed at a predetermined pitch. A supply port 3 supplying liquid is provided between two rows of the energy generating elements 2 on the substrate 1. On the substrate 1, ejection orifices 5 that open above the energy generating element 2 and liquid flow paths 6, each of which is connected from the supply port 3 to one of the ejection orifices 3, are formed. The flow paths 6 are covered by an ejection orifice forming member and a wall member 4 located around the ejection orifice forming member with a gap in between is formed.

First Embodiment

A first embodiment of a manufacturing method of the liquid ejection head of the present invention will be described with reference to FIG. 2. FIGS. 2A to 2E are diagrams showing a cross-section in each process taken along A-A line in FIG. 1 in a direction perpendicular to the substrate 1. Although, in the description below, one liquid ejection head (one chip) is illustrated and described, a wafer of 6 to 12 inches can be used as the substrate 1, so that a plurality of liquid ejection heads can be manufactured on one wafer. Therefore, one liquid ejection head can be obtained by dividing the wafer.

Figure 2A:
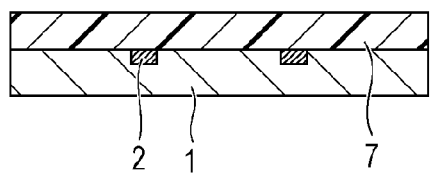
FIG. 2A is a diagram showing an example of a manufacturing method of the liquid ejection head of the present invention.

First, as shown in FIG. 2A, the substrate 1 including a first layer 7 is prepared. The first layer 7 includes the energy generating element 2 on the surface thereof. The first layer 7 is provided by coating a resin material such as a positive-type photosensitive resin on the substrate 1 or laminating a film of resin material on the substrate 1. The first layer can be dissolved by a solution such as a solvent because the first layer is removed from the substrate 1 in a later process. Therefore, the first layer can include a positive-type photosensitive resin. For example, polymethyl isopropenyl ketone, copolymer of methacrylic acid and methacrylate, and the like can be used. This is because these chemical compounds can be easily removed by a solvent and have a simple composition, so that the constituent components do not affect a second layer 10 described later so much.

Figure 2B:
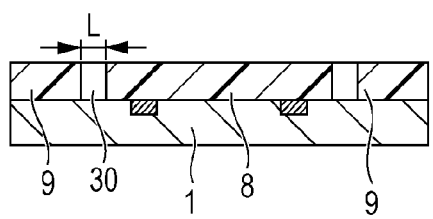
FIG. 2B is a diagram showing an example of the manufacturing method of the liquid ejection head of the present invention.

Next, as shown in FIG. 2B, a part of the first layer 7 is removed from the first layer 7, so that a flow path mold 8 for forming a flow path of liquid and a member (A) 9 located outside the mold 8 with a gap 30 in between are formed. As described above, there is a gap (length of width; L) between the mold 8 and the member (A) 9. If the first layer 7 is flat, the heights of the mold 8 and the member (A) 9 are the same. When a photosensitive resin is used for the first layer 7, the mold 8 and the member (A) 9 are formed by exposing and developing the first layer 7 and removing a part of the first layer 7. As another method, dry etching may be performed on the first layer 7. The outside of the mold 8 means outside of the center of the mold 8.

Figure 4A:
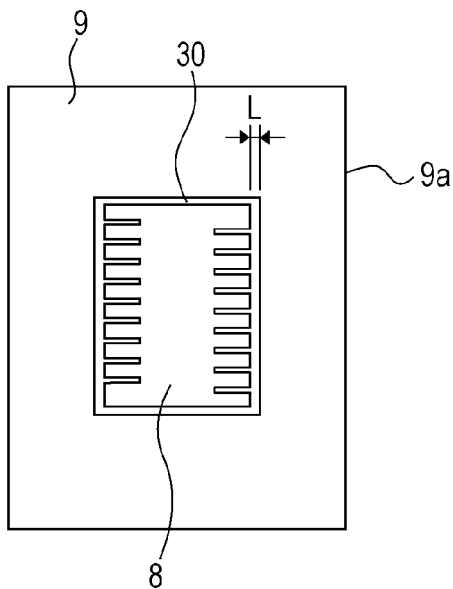
FIG. 4A is a diagram for explaining an example of a manufacturing method of the liquid ejection head of the present invention.

FIG. 4 is a diagram of the mold 8 and the member (A) 9 as seen from above in a state shown in FIG. 2B. As shown in FIG. 4A, the member (A) 9 is provided outside the mold 8 to surround the mold 8. In FIG. 4A, an outer contour 9a of the member (A) 9 corresponds to a unit area of one liquid ejection head. The width of the gap 30 between the mold 8 and the member (A) 9 is preferred to be greater than or equal to 10 micrometers and smaller than or equal to 50 micrometers so that a second layer 10 can be evenly coated on the mold 8 and the member (A) 9 in a later process. The length L in a direction in parallel with the surface of the substrate is preferred to be smaller than or equal to 50 micrometers. On the other hand, the length L is preferred to be greater than or equal to 10 micrometers from a viewpoint of strength of the ejection orifice forming member. From the same viewpoint, in one unit of liquid ejection head, it is preferred that the area of the member (A) is greater than the area of the mold 8 in a cross section in parallel with the surface of the substrate. Further, in a cross section in parallel with the surface of the substrate, it is preferred that the area of the member (A) is greater than or equal to three times the area of the mold 8. From a viewpoint of designing a normal liquid ejection head, it is preferred that the area of the member (A) is smaller than or equal to 100 times the area of the mold 8.

Figure 4B:
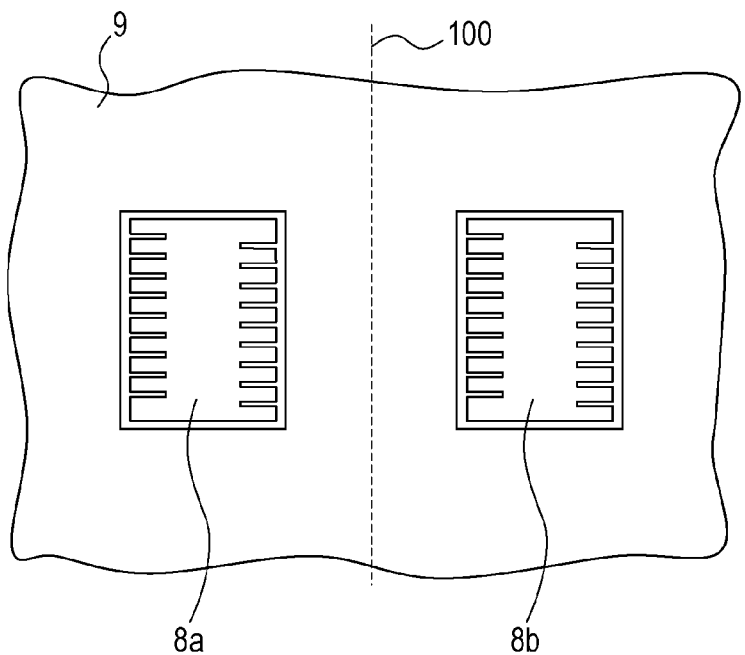
FIG. 4B is a diagram for explaining an example of the manufacturing method of the liquid ejection head of the present invention.

When providing a plurality of units of liquid ejection heads at the same time, as shown in FIG. 4B, the member (A) 9 is provided between a mold 8a and a mold 8b, each of which corresponds to one unit of liquid ejection head. The member (A) 9 is provided over the boundary 100 (dashed line) between the liquid ejection head units. The boundary 100 may be a line formed by actually forming unevenness on the substrate or may be a virtual line. It is possible to extract one liquid ejection head unit by cutting the substrate along the boundary 100.

Figure 2C:
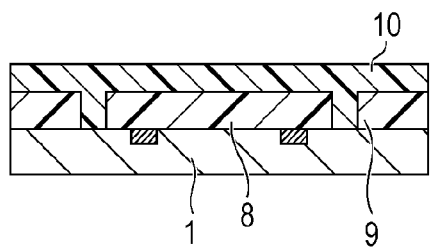
FIG. 2C is a diagram showing an example of the manufacturing method of the liquid ejection head of the present invention.

Next, as shown in FIG. 2C, the second layer 10 is provided to fill the gap 30 and cover the mold 8 and the member (A) 9. As a method for providing the second layer 10, for example, there are a spin coating method, a curtain coating method, and a laminating method. The second layer can include a negative-type photosensitive resin. A negative-type photosensitive resin composition including a resin having a polymerizable group such as an epoxy group, an oxetane group, and a vinyl group and a polymerization initiator corresponding to such a resin is used as a composition including the negative-type photosensitive resin. This is because a resin including the above functional groups has a high polymerization reactivity and an ejection orifice forming member having high mechanical strength can be formed from the ejection orifice forming member.

The thickness of the first layer 7 and the thickness of the second layer 10 can be set arbitrarily. When forming an ejection orifice ejecting a small droplet smaller than 10 pl and a liquid flow path corresponding to the ejection orifice, it is preferred that the thickness of the first layer 7 is greater than or equal to 3 micrometers and smaller than or equal to 15 micrometers and the thickness of the second layer 10 is greater than or equal to 3 micrometers and smaller than or equal to 10 micrometers from the upper surface of the mold 8.

When the gap 30 is formed to be very small, the second layer 10 can be substantially evenly provided on the mold 8 and the member (A) 9. The second layer 10 enters the gap 30 and fills the gap 30 and the gap portion becomes a part of the ejection orifice forming member.

Next, an ejection orifice forming member 11 for forming an ejection orifice is formed from the second layer 10. An opening to be an ejection orifice is provided in the ejection orifice forming member 11. The opening can be finely provided at a high degree of positional accuracy by photolithography as described below.

Figure 2D:
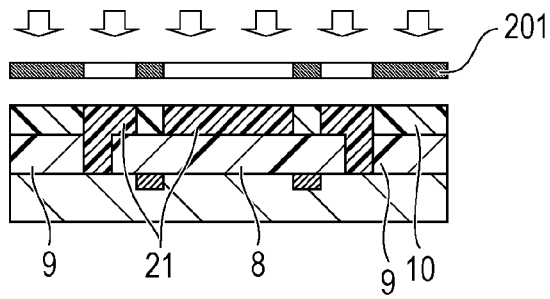
FIG. 2D is a diagram showing an example of the manufacturing method of the liquid ejection head of the present invention.

First, as shown in FIG. 2D, pattern exposure is performed on the second layer 10. The second layer 10 is exposed through a mask 201. When the second layer 10 is a negative-type photosensitive resin composition, exposed portions 21 are hardened. Here, the second layer 10 may be heated as needed to promote the hardening.

Figure 2E:
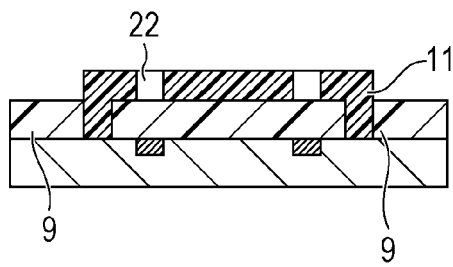
FIG. 2E is a diagram showing an example of the manufacturing method of the liquid ejection head of the present invention.

Next, as shown in FIG. 2E, the second layer 10 is developed to remove unexposed portions of the second layer 10 and the ejection orifice forming member 11 is formed. At this time, an opening 22, a part of which becomes an ejection orifice, can be formed at the same time. The opening 22 can be formed at a position facing an energy generating surface of the energy generating element 2.

In this way, the second layer 8 is evenly formed on the mold 8 and the member (A) 9, so that the ejection orifice forming member 11, in which the variation of the thickness is suppressed, is obtained from the second layer 10.

Figure 2F:
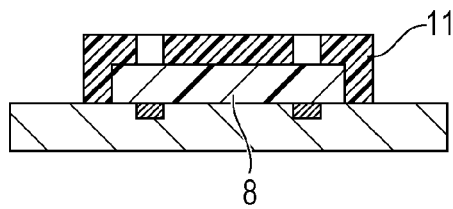
FIG. 2F is a diagram showing an example of the manufacturing method of the liquid ejection head of the present invention.

Next, as shown in FIG. 2F, the member (A) 9 located outside the mold 8 with a gap between the member (A) 9 and the mold 8 is removed (E process). The removal of the member (A) 9 is performed by a method to dissolve the member (A) 9 by a solution or the like. The ejection orifice forming member 11 is hardened, so that the mold 8 may be removed along with the member (A) 9. However, it is desired that the mold 8 is not removed at this timing in order to prevent a third layer described later from entering the space to be the flow path. When the member (A) 9 is formed by a resin, light such as ultraviolet light is selectively irradiated to the member (A) 9 and a dissolution selection ratio of the member (A) 9 to the mold 8 which is not irradiated by the light with respect to the solution is increased, and thereafter the member (A) 9 is dissolved by the solution, so that the member (A) 9 can be selectively removed.

Figure 2G:
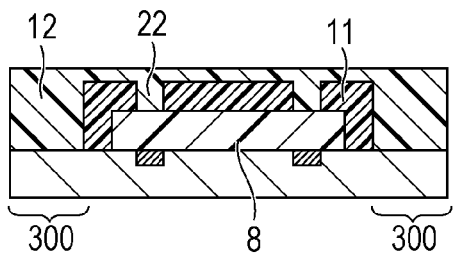
FIG. 2G is a diagram showing an example of the manufacturing method of the liquid ejection head of the present invention.

Next, a wall member located outside the ejection orifice forming member with at least a partial gap between the wall member and the ejection orifice forming member is formed. The wall member may be formed by disposing a patterned member or may be formed by photolithography. Here, an embodiment will be described. First, as shown in FIG. 2G, a third layer 12 is provided to cover the ejection orifice forming member 11 on the substrate 1 from which the member (A) 9 is removed. The third layer can include a negative-type photosensitive resin. Further, the second layer can include a negative-type photosensitive resin having the same composition as that of the second layer 10. Further, the compounds included in the third layer 12 and the second layer 10 can be the same and the compositions of the third layer 12 and the second layer 10 can be the same. The thickness of the upper surface (the front surface) of the third layer 12 may be thicker than or thinner than or equal to the thickness of the upper surface of the ejection orifice forming member 11. In other words, the position of the upper surface (the front surface) of the third layer 12 may be higher than or lower than or equal to the position of the upper surface of the ejection orifice forming member 11. FIG. 2G shows a state in which the position of the upper surface of the third layer 12 is higher than the position of the upper surface of the ejection orifice forming member 11. Here, a portion 300 of the substrate 1 on which the third layer 12 is provided is a circuit unit where a transistor and the like used for a drive circuit to drive the energy generating element 2 are provided. The circuit unit 300 is covered by the third layer 12.

Figure 2H:
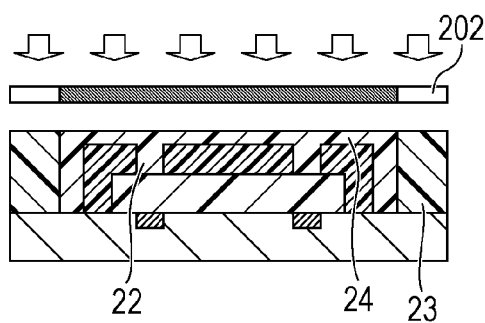
FIG. 2H is a diagram showing an example of the manufacturing method of the liquid ejection head of the present invention.
Figure 2I:
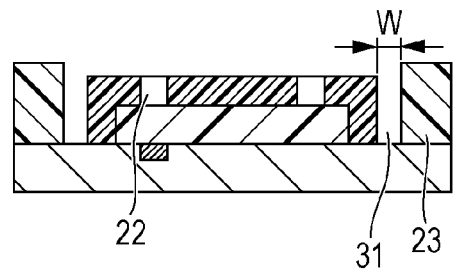
FIG. 2I is a diagram showing an example of the manufacturing method of the liquid ejection head of the present invention.

Next, as shown in FIG. 2H, the third layer 12 is exposed through a mask 202 and an exposed portion 23 is hardened. In the third layer 12, a portion inside the opening 22, which will be an ejection orifice, and a portion above the opening 22 need to be removed, so that light is blocked by the mask 202. An unexposed portion 24 is not hardened. Here, the circuit unit 300 is substantially covered by the exposed portion 23, so that the circuit unit 300 is protected. At this time, a gap 31 is formed between the ejection orifice forming member 11 and the third layer 12. The width (W) of the gap 31 can be formed to be small from the viewpoint of protecting the circuit unit. On the other hand, the width (W) of the gap 31 can be large from the viewpoint of storing ink when cleaning is performed by wiping the ejection orifice surface. Therefore, the width (W) of the gap is appropriately set from the viewpoints of ink ejection volume of the liquid ejection head, the total number of ejection orifices, physical properties of the ink, and the like. Preferably, the width (W) is set to greater than or equal to the diameter of the ejection orifice and smaller than or equal to five times the diameter of the ejection orifice. Then, as shown in FIG. 2I, the unexposed portion 24 is removed by, for example, a liquid development method, so that a wall member 4 located outside the ejection orifice forming member 11 with at least a partial gap between the wall member 4 and the ejection orifice forming member 11 can be formed from the third layer. The gap may be formed in at least a part of an area between the ejection orifice forming member 11 and the wall member 4. In other words, the ejection orifice forming member 11 and the wall member 4 may be partially connected to each other. However, the wall member can be provided with a gap between the wall member and the ejection orifice forming member in the entire area of the wall member. The outside of the ejection orifice forming member 11 means outside of the center of the ejection orifice forming member 11. In FIG. 2, the outside is the left side area and the right side area of the ejection orifice forming member 11. When dissolving the negative-type photosensitive resin by a solution, an appropriate solvent such as xylene may be used as the solution according to the composition of the negative-type photosensitive resin. The mold 8 is exposed through the opening 22.

Figure 2J:
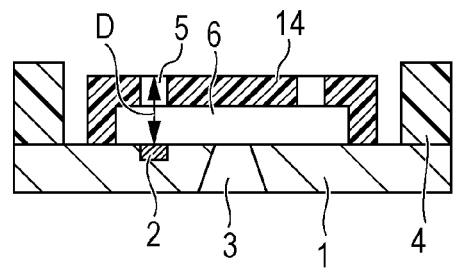
FIG. 2J is a diagram showing an example of the manufacturing method of the liquid ejection head of the present invention.

Next, as shown in FIG. 2J, a supply port 3 is formed in the substrate 1 by dry etching, wet etching, or the like, so that the mold 8 is connected to the outside from the rear surface of the substrate. Then, the mold 8 is dissolved and removed by an appropriate solution and a liquid flow path 6 connected to the ejection orifice 5 is formed.

After the ejection orifice forming member 11 is formed, the evenness of the ejection orifice forming member 11 is not damaged by the following processes, so that a distance D between the energy generating surface of the substrate 1 and the ejection orifice 5 (the ejection orifice surface 14) becomes even. Therefore, the amount of liquid ejected from a plurality of ejection orifices can be constant. Further, the electrical circuit unit is formed between the substrate and the wall member, so that the electrical circuit unit can be appropriately protected.

Second Embodiment

A second embodiment of the present invention will be described with reference to FIG. 3. FIGS. 3A to 3D are cross-sectional views showing a cross section in each process. FIGS. 3A to 3D are cross-sectional views taken along the same line as in FIGS. 2A to 2J.

Figure 3A:
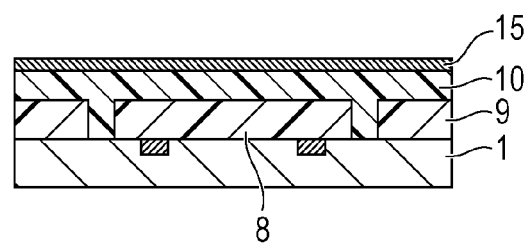
FIG. 3A is a diagram showing an example of a manufacturing method of the liquid ejection head of the present invention.

In the present embodiment, from the beginning to the process shown in FIG. 2C (C process), the same processes as those in the first embodiment are performed. However, after the process for providing the second layer, a liquid-repellent material is given to the surface of the second layer. Specifically, as shown in FIG. 3A, a liquid-repellent material 15 is given to the surface of the second layer 10 to give liquid-repellent property to the surface of the second layer 10. At least part of the liquid-repellent material 15 may be permeated into the second layer 10. When the liquid to be ejected is water-based ink or oil-based ink, the thickness of a portion to which the liquid-repellent property is given in the vertical direction may be 2 micrometers. When the liquid-repellent material is stacked on the second layer, the liquid-repellent material 15 is formed evenly on the substrate in the same manner as the first layer 7 and the second layer 10. As the liquid-repellent material 15, a compound containing fluorine is used. For example, a photosensitive epoxy resin film containing fluorine, a composition containing a condensate of fluorine-containing silane and silane containing polymerizable group, or the like is used.

Figure 3B:
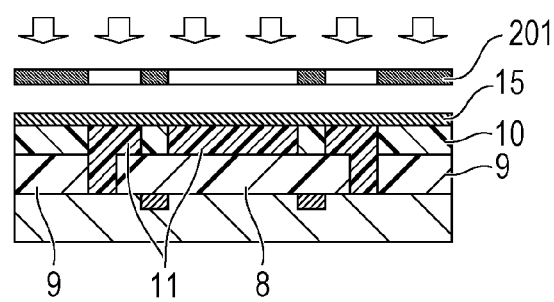
FIG. 3B is a diagram showing an example of the manufacturing method of the liquid ejection head of the present invention.
Figure 3C:
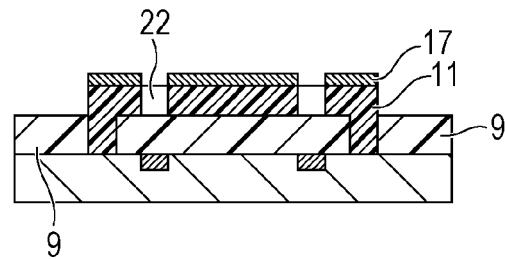
FIG. 3C is a diagram showing an example of the manufacturing method of the liquid ejection head of the present invention.

Next, as shown in FIG. 3B, the second layer 10 and the liquid-repellent material 15 are exposed through a mask 201 to form the ejection orifice forming member 11. The liquid-repellent material 15 the second layer 10 can be patterned at the same time by photolithography. Further, the exposed portion is hardened and then developed, and the unexposed portions of the second layer 10 and the liquid-repellent material 15 are removed. Thereby, as shown in FIG. 3C, liquid-repellent portions 17 on which a liquid-repellent process is performed can be provided around the opening 22 which will be an ejection orifice of the ejection orifice forming member 11. The liquid-repellent materials located on areas other than the area around the opening 22 (for example, an area on the unexposed portion of the second layer 10) are removed, so that the liquid-repellent property is not given to the areas.

Figure 3D:
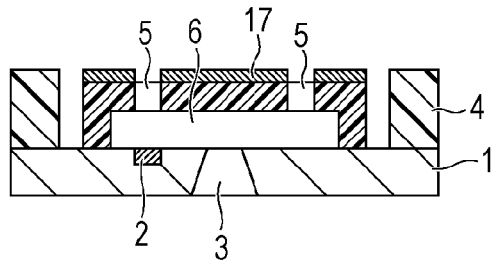
FIG. 3D is a diagram showing an example of the manufacturing method of the liquid ejection head of the present invention.

Thereafter, the same processes as those of FIGS. 2F to 2I in the first embodiment are performed. For example, first, the member (A) 9 is removed, and then the third layer 12 is provided to cover the ejection orifice forming member 11. On the liquid-repellent portion 17 on the ejection orifice forming member 11, the third layer 12 may be repelled. However, there is the gap 31 having the width (W) between the ejection orifice forming member 11 and the third layer 12. Thereby, it is possible to prevent the third layer 12 from being given to the wall member 4. Thereafter, the necessary portions of the third layer 12 are hardened and unhardened portions are removed. Then, the supply port 3 is formed in the substrate 1 and the mold 8 is removed to form the liquid flow path 6. In this way, the liquid ejection head shown in FIG. 3D is obtained. The preferred dimensions are the same as those in the first embodiment.

As shown in FIG. 3D, in the liquid ejection head manufactured by the second embodiment, the liquid-repellent portion 17 is present on the opening surface where the ejection orifice 5 of the ejection orifice forming member 11 opens. In other words, the liquid-repellent process is performed on the ejection orifice forming member. Therefore, the liquid to be ejected, which is stored in the flow path, is not stay on the opening surface and can form a meniscus at substantially the same position as the ejection orifice 5. Even when part of ejected liquid flows as mist and attaches to the ejection orifice surface, the mist is prevented from being fixed to the ejection orifice surface and the mist can be moved into the gap 31 by the cleaning using the wiping blade or the like provided in a liquid ejection device. On the other hand, there is no liquid-repellent portion on the wall member 4. Specifically, the liquid-repellent process is not performed on the wall member, so that, after the cleaning, the mist of the ejected liquid is easily moved into the gap 31 and onto the wall member 4. Thus, thereafter, the moved liquid can be easily removed by a suction restoration operation by a suction mechanism provided in the recording device. As described above, in the present invention, the ejection orifice forming member and the wall member are manufactured by different processes, so that it is possible to manufacture a liquid ejection head in which the liquid-repellent process is performed on the ejection orifice forming member and the liquid-repellent process is not performed on the wall member.

EXAMPLES

Examples will be described below to describe the present invention in more detail. Hereinafter, "pbw" is based on mass.

Example 1

An example 1 will be described with reference to FIGS. 2A to 2J. First, the substrate 1 (6-inch wafer) provided with the first layer 7 is prepared (FIG. 2A). The first layer 7 is formed by coating ODUR-1010 (made by Tokyo Ohka Kogyo Co., Ltd.), which is a positive-type photosensitive resin, on the substrate 1 by the spin coating method and drying the ODUR-1010 at 120 degrees Celsius. The average of the thickness of the formed first layer 7 is 7 micrometers and the standard deviation of the thickness of the first layer 7 in the substrate 1 (6-inch wafer) is 0.1 micrometer or less (measured at 350 points in the 6-inch wafer).

Next, the first layer 7 is exposed using a mask and an exposed portion is removed, so that the mold 8 and the member (A) 9 located outside the mold 8 with a gap 30 in between are formed (FIG. 2B). At this time, the length of the width of the gap 30 is 30 micrometers.

Next, a composition including the components shown in the table 1 below is coated by the spin coating method so that the gap 30 is filled and the member (A) 9 and the mold 8 are covered. Then, the composition is dried at 90 degrees Celsius for three minutes and the second layer 10 is formed (FIG. 2C). The average of the thickness of the second layer 10 from the upper surface of the mold 8 is 5 micrometers and the standard deviation of the thickness is 0.2 micrometers (measured at 350 points in the 6-inch wafer).

TABLE 1

| Composition | Parts by weight |
|---|---|
| EHPE-3150 (made by Daicel Chemical Industries, Ltd.) | 100 pbw |
| A-187 (made by Nippon Unicar Co., Ltd.) | 5 pbw |
| Copper triflate | 0.5 pbw |
| SP-170 (made by Asahi Denka Kogyo k.k.) | 0.5 pbw |
| Methyl isobutyl ketone | 100 pbw |
| Xylene | 100 pbw |

Next, the second layer 10 is exposed using MPA-600 Super (product name, made by Canon Inc.) (FIG. 2D). Further, post-bake and development are performed on the second layer 10 and the ejection orifice forming member 11 in which the opening 22 is provided is formed from the second layer 10 (FIG. 2E). The amount of exposure is 1 J/cm$^2$. As a developing solution, a liquid mixture of methyl isobutyl ketone/xylene=2/3 is used. As a post-processing rinse liquid, xylene is used. The diameter of the opening 22 is 12 micrometers.

Next, by using a mask aligner UX-3000SC (product name, made by Ushio, Inc.), deep-UV light (wavelength is 220 nm to 400 nm) is irradiated to the member (A) 9 under a condition of 10 J/cm$^2$, and thereafter the member (A) 9 is dissolved and removed by methyl isobutyl ketone (FIG. 2F).

Next, the composition shown in Table 1 is coated to cover the ejection orifice forming member 11 and the third layer 12 is formed so that the thickness from the surface of the substrate 1 to the upper surface of the third layer 12 on the ejection orifice forming member 11 is 18 micrometers (FIG. 2G).

Next, the third layer 12 is exposed (the amount of exposure is 1 J/cm$^2$) by MPA-600 Super (product name, made by Canon Inc.) (FIG. 2H), and post-bake, development, and rinse are performed to form the gap 31 between the exposed portion 23 of the third layer 12 and the ejection orifice forming member 11. The width W of the gap 31 is 30 micrometers. The exposed portion 23 becomes the wall member 4. Thereby, the wall member 4 located outside the ejection orifice forming member with a gap between them is formed from the third layer (FIG. 2I). The gap is formed in the entire area between the ejection orifice forming member and the wall member. As a developing solution, a liquid mixture of methyl isobutyl ketone/xylene=2/3 is used. As a post-processing rinse liquid, xylene is used.

Next, by using a hydroxylated tetramethylammonium solution at 80 degrees Celsius as an etching solution, anisotropic etching is performed on the substrate 1 of silicon to form the supply port 3. Thereafter, the mold 8 is dissolved and removed by methyl lactate and the ejection orifice 5 having a diameter of 12 micrometers is formed (FIG. 2J).

In the substrate 1 (6-inch wafer), the average of the distance D is 12 micrometers and the standard deviation of the distance D is 0.25 micrometers (measured at 350 points in the 6-inch wafer).

Finally, the 6-inch wafer is cut by a dicing saw and the liquid ejection head is manufactured.

Example 2

After the process of providing the second layer in the example 1, specifically, after the process shown in FIG. 2C, a liquid-repellent material is given to the surface of the second layer 10. As the liquid-repellent material, a material is used which is obtained by stirring 28 grams (0.1 mole) of glycidyl propyl triethoxysilane, 18 grams (0.1 mole) of methyltriethoxysilane, 6.6 grams (0.013 mole) of tridecafluoro-1,1,2,2-tetrahydrooctyl triethoxy silane, 17.3 grams of water, and 37 grams of ethanol at a room temperature and then refluxing these materials for 24 hours. Other than the above, the liquid ejection head is manufactured in the same manner as in the example 1.

In the substrate 1 (6-inch wafer), the average of the distance D is 12 micrometers and the standard deviation of the distance D is 0.25 micrometers (measured at 350 points in the 6-inch wafer).

Comparative Example 1

A manufacturing method of a liquid ejection head of a comparative example will be described with reference to FIGS. 5A to 5F. FIGS. 5A to 5F show a cross section in each process of manufacturing the liquid ejection head of the comparative example.

Figure 5A:
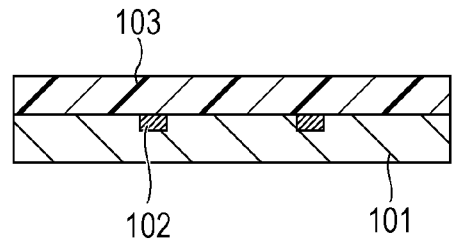
FIG. 5A is a diagram showing a manufacturing method of a liquid ejection head.

ODUR-1010 (product name, made by Tokyo Ohka Kogyo Co., Ltd.) is coated on a silicon substrate 101 (6-inch wafer) including an energy generating element 102 and dried, so that a positive-type photosensitive resin layer 103 having a thickness of 7 micrometers is formed (FIG. 5A).

Figure 5B:
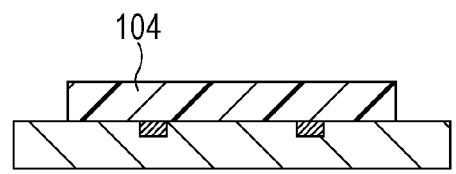
FIG. 5B is a diagram showing the manufacturing method of the liquid ejection head.

Next, exposure and development are performed on the positive-type photosensitive resin layer 103 and a flow path mold 104 is formed (FIG. 5B).

Figure 5C:
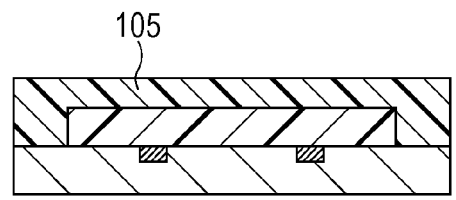
FIG. 5C is a diagram showing the manufacturing method of the liquid ejection head.

Next, the composition shown in Table 1 is coated on the mold 104 by the spin coating method and dried at 90 degrees Celsius for three minutes and a covering layer 105 is formed so that the thickness of a portion of the covering layer 105 provided on the mold 104 is 7 micrometers (FIG. 5C).

Figure 5D:
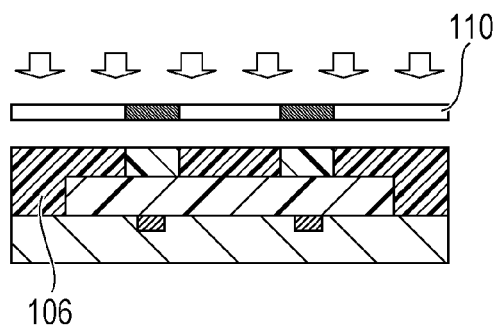
FIG. 5D is a diagram showing the manufacturing method of the liquid ejection head.
Figure 5E:
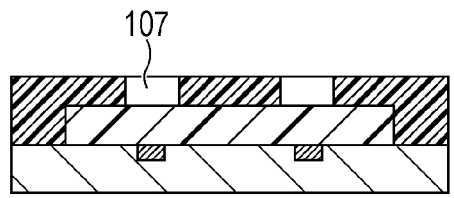
FIG. 5E is a diagram showing the manufacturing method of the liquid ejection head.

Next, the covering layer 105 is exposed using a mask 110 and an exposed portion 106 is hardened (FIG. 5D). Development is performed and unexposed portion of the covering layer 105 is removed, so that a member 111 forming a wall of the flow path and an ejection orifice 107 having a diameter of 12 micrometers is formed (FIG. 5E).

Figure 5F:
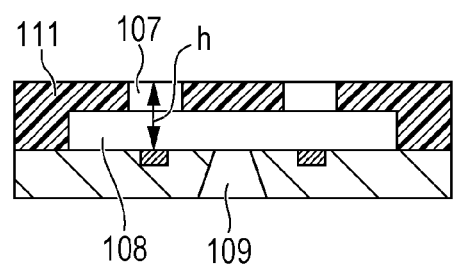
FIG. 5F is a diagram showing the manufacturing method of the liquid ejection head.

Next, a supply port 109 is formed in the substrate 101, and thereafter the mold 104 is removed and a flow path 108 is formed (FIG. 5F).

In the substrate (6-inch wafer), the average of distance h from the energy generating surface of the energy generating element 102 to the ejection orifice 107 is 12 micrometers and the standard deviation of the distance h is 0.60 micrometers (measured at 350 points in the 6-inch wafer).

Finally, the 6-inch wafer is cut by a dicing saw and the liquid ejection head is manufactured.

EVALUATION

As described above, it is known that there is a large difference between the standard deviation of the distance D of the liquid ejection heads of the examples 1 and 2 and the standard deviation of the distance h of the liquid ejection head of the comparative example 1.

The reason why the standard deviation of the distance D in the examples 1 and 2 is as small as 0.25 micrometer is because it is assumed that the ejection orifice forming member 11 whose variation of the thickness is very small can be obtained from the second layer 10 which is formed to be flat.

On the other hand, one of the reasons why the standard deviation of the distance h is as large as 0.60 micrometer is because it is assumed that there is a difference of the height of the upper surface of the covering layer 105 between a portion where there is the mold 104 under the covering layer 105 and a portion where there is no mold 104 under the covering layer 105. Further, in the comparative example 1, there is no mold 104 outside a mold 104 provided on an outermost area of the 6-inch wafer, so that the height of the upper surface of the covering layer 105 in an outer area of the wafer is formed to be lower than that in the central portion of the wafer. Therefore, this is also considered to be one of the reasons of the above.

Next, a storage endurance test is performed on the liquid ejection heads of the examples 1 and 2 and the comparative example 1. The liquid ejection heads are immersed in ink BCI-6C made by Canon and left for 100 hours under a temperature of 121 degrees Celsius and a pressure of 2 atmospheres. Thereafter, the liquid ejection heads are taken out from the ink. When observing the interface between the substrate 1 and the wall member in each liquid ejection head, no detachment or deformation between the substrate 1 and the wall member 4 is observed in all the liquid ejection heads of the examples 1 and 2 and the comparative example 1.

Next, a print durability test is performed using the liquid ejection heads of the examples 1 and 2 and the comparative example 1. Print recording is performed using a plurality of liquid ejection heads cut from the 6-inch wafer. As the liquid, the ink BCI-6C made by Canon is used. Recording in the condition of ejection volume Vd=1 pl, ejection frequency f=15 kHz, and the number of ejection times is $3*10^8$ is performed including the same head cleaning operation as that in the actual printing operation. When visually observing images obtained by the recording, very high quality recording images are obtained when the recording is performed using the liquid ejection heads of the examples 1 and 2. Equally high quality images are obtained even when any one of a plurality of liquid ejection heads obtained from one 6-inch wafer is used. On the other hand, when the recording is performed using the liquid ejection head of the comparative example 1, irregularity is observed in the recording images compared with the recording images of the examples 1 and 2. Further, a state of the irregularity is slightly different for each of the recording images obtained by using a plurality of liquid ejection heads obtained from the same 6-inch wafer.

It is considered that this is because the standard deviation of the distance D is smaller than that of the distance h, so that the variation of the volume of the ink ejected from the liquid ejection heads according to the example 1 and 2 is smaller than that of the ink ejected from the liquid ejection head according to the comparative example. All the liquid ejection heads of the examples 1 and 2 and the comparative example 1 are a sufficiently reliable liquid ejection head that does not cause recording irregularity due to disconnection of wiring in the circuit unit or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-215334, filed Sep. 29, 2011 and Japanese Patent Application No. 2012-165879 filed Jul. 26, 2012, both of which are hereby incorporated by reference herein in their entirety.

The invention claimed is:

1. A manufacturing method of a liquid ejection head including a flow path connected to an ejection orifice that ejects liquid, the manufacturing method comprising:
    a step of preparing a substrate including a first layer;
    a step of forming a flow path mold for forming the flow path and a member, from the first layer, the member is not part of the flow path mold and is located outside the flow path mold with a gap between the flow path mold and the member;
    a step of providing a second layer so that the gap is filled with the second layer, the second layer covers the flow path mold and the member located outside the flow path mold with the gap between the flow path mold and the member;
    a step of forming an ejection orifice forming member for forming an ejection orifice from the second layer;
    a step of removing the second layer on the member;
    a step of removing the member located outside the flow path mold;
    a step of forming a third layer so that the third layer covers the ejection orifice forming member; and
    a step of forming a wall member located outside the ejection orifice forming member from the third layer, with a gap between the ejection orifice forming member and the wall member.

2. The manufacturing method of a liquid ejection head according to claim 1, wherein the first layer includes a positive-type photosensitive resin.

3. The manufacturing method of a liquid ejection head according to claim 1, wherein the second layer includes a negative-type photosensitive resin.

4. The manufacturing method of a liquid ejection head according to claim 1, wherein the third layer includes a negative-type photosensitive resin.

5. The manufacturing method of a liquid ejection head according to claim 1, wherein, in a cross section in parallel with a surface of the substrate, an area of the member is greater than an area of the flow path mold.

6. The manufacturing method of a liquid ejection head according to claim 1, wherein, in a cross section in parallel with a surface of the substrate, an area of the member is greater than or equal to three times an area of the flow path mold and smaller than or equal to 100 times an area of the flow path mold.

7. The manufacturing method of a liquid ejection head according to claim 1, wherein a width of the gap between the flow path mold and the member is greater than or equal to 10 micrometers and smaller than or equal to 50 micrometers.

8. The manufacturing method of a liquid ejection head according to claim 1, wherein a width of the gap between the ejection orifice forming member and the wall member is greater than or equal to a diameter of the ejection orifice and smaller than or equal to five times the diameter of the ejection orifice.

9. The manufacturing method of a liquid ejection head according to claim 1, wherein a liquid-repellent material is given to a surface of the second layer after the step of providing the second layer.

10. The manufacturing method of a liquid ejection head according to claim 1, wherein an electrical circuit unit is formed between the substrate and the wall member.

11. The manufacturing method of a liquid ejection head according to claim 1, wherein the wall member is provided with the gap between the election orifice forming member and the wall member in the entire area of the wall member.

* * * * *